Jan. 11, 1955   G. VAN N. MORIN   2,699,170
WATERPROOF DISPOSABLE DIAPER
Filed May 5, 1954
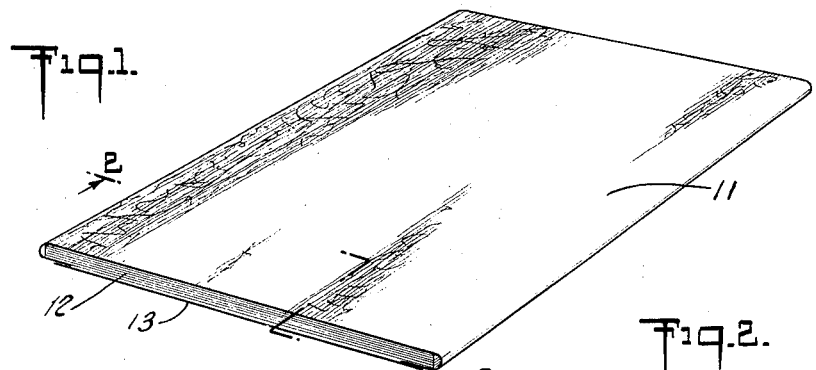
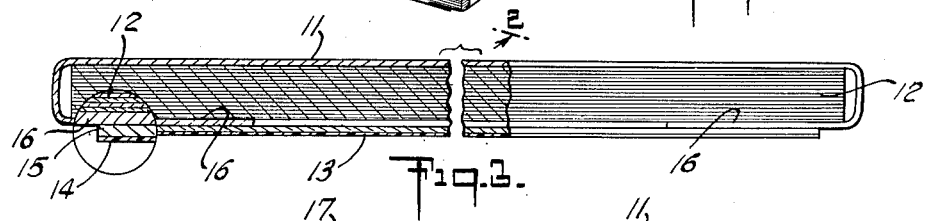
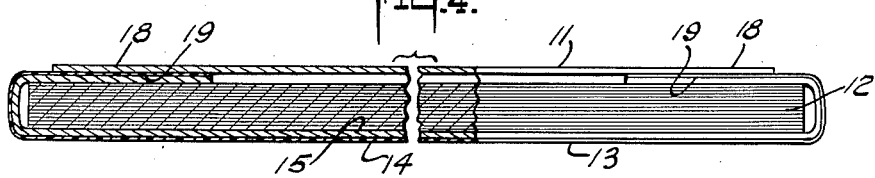
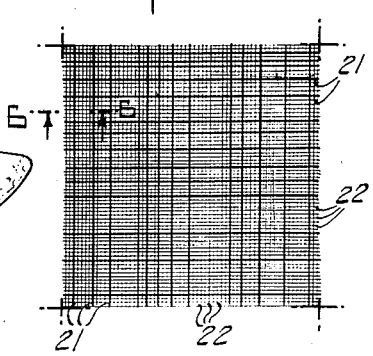
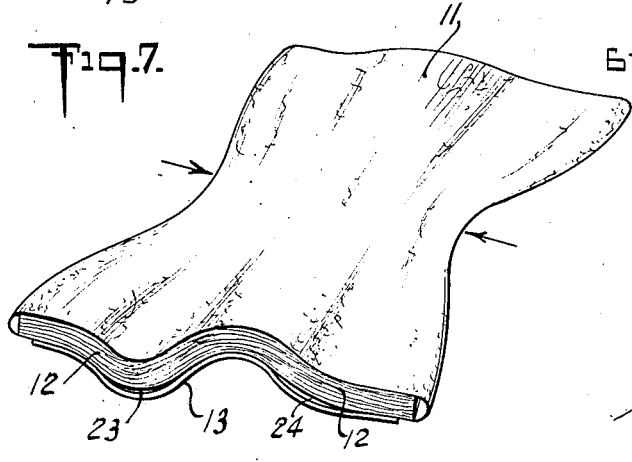
INVENTOR
GEORGE V. N. MORIN
BY
Charles A. Harris
ATTORNEY

United States Patent Office 2,699,170
Patented Jan. 11, 1955

2,699,170

WATERPROOF DISPOSABLE DIAPER

George Van Norden Morin, Hightstown, N. J., assignor to Chicopee Manufacturing Corporation, a corporation of Massachusetts Application May 5, 1954, Serial No. 427,759

5 Claims. (Cl. 128—287)

The present invention relates to disposable diapers, more particularly to such diapers which present a waterproof external surface and yet simulate the hand and drape of woven or knitted re-usable diapers.

Sheets of soft and flexible waterproof plastic materials, such as polyethylene, have been proposed for use as backing sheets for disposable diapers to replace stiffer water repellent papers, thereby providing these diapers with hand and drape similar to woven or knitted re-usable diapers and improving their moisture retaining ability. However, since disposable diapers can only compete with re-usable diapers if their cost is sufficiently low, the suggested use of more expensive plastic materials has tended to "price these diapers out of the market." Also, the nonabsorbent inner face of this type of film encourages the seepage or running of liquids along its surface with consequent leakage at the edges of the diaper.

The present invention contemplates a waterproof disposable diaper which possesses excellent hand and drape, which incorporates a minimum of the above-mentioned more expensive waterproof materials while utilizing a maximum of the absorbent materials it contains, and which is designed to minimize the above-mentioned seepage difficulties. The diaper of this invention comprises a thin facing sheet, an absorbent layer and a backing sheet laminate of a thin plastic film and a supporting sheet of absorbent relatively soft paper. The thickness of the more expensive plastic film is kept to a minimum, consistent with the wear and surface abrasion it must resist, while the absorbent supporting sheet may be relatively thick to provide strength, body and absorptive capacity to the backing sheet.

A paper backed film of this type of plastic is inherently more rigid than a free film of corresponding strength. To overcome this natural rigidity, the backing sheet of this invention is embossed with a closely spaced pattern to improve its hand and drape. The backing sheet is joined with corresponding edges of the facing sheet to provide an envelope for holding the absorbent layer. The backing sheet is arranged with the film on the outside of the diaper and the absorbent paper layer on the inside. The embossed film provides an abrasion resistant and aesthetically pleasing external surface for the diaper, while the internal absorbent layer provides a "blotter" effect tending to prevent seepage along the backing sheet and adds to the total absorptive capacity of the diaper.

Objects of the invention other than those generally described above will be apparent to one skilled in the art from the following description and claims taken together with the drawings wherein:

Fig. 1 is an isometric view of a diaper of this invention;

Fig. 2 is an enlarged fragmental view partly in section and partly in elevation along the line 2—2 of Fig. 1 having a magnified portion shown circled at one end thereof;

Fig. 3 is a similar enlarged view of a slightly different embodiment of the invention;

Fig. 4 is another enlarged sectional view partly in section and partly in elevation of a still different embodiment;

Fig. 5 is a plan view of a portion of the external surface of the backing sheet of the diaper of Fig. 1;

Fig. 6 is a greatly enlarged sectional view along the line 6—6 of Fig. 5;

Fig. 7 is an isometric view showing the diaper of Fig. 1 slightly bunched.

Referring to Figs. 1 and 2, there is shown a diaper comprising a thin permeable facing sheet 11, an absorbent layer 12, and a thin waterproof backing sheet 13. The facing sheet, which is preferably a thin, highly permeable fibrous web such as may be formed by print bonding a laminate of card webs, or by forming a "wet-strength" web by a paper making process, covers one side of the absorbent layer passing around its ends to overlap the edges of the opposite side of the absorbent layer. The backing sheet, which is a laminate of a thin flexible plastic film 14 and a supporting sheet 15 of absorbent paper, covers the other side of the absorbent layer with its absorbent side toward the layer and overlaps the turned over portions 16 of the facing sheet 11 adjacent the edges of the diaper. The overlapping portions of the backing sheet may be sealed or glued to the turned over portions 16 of the facing sheet and this sealed portion of the two sheets may in turn be adhered to the absorbent layer 12. Glue may be used for this purpose in which case it should have the general properties of dry film softness, water resistance, adhesive strength, and light color. Glues formulated on the basis of a polyvinyl acetate emulsion are preferred but waterproofed animal glues and casein based glues may be used. Also, a thermoplastic adhesive may be inserted between the contiguous portions of the two sheets and heat applied to heat seal them together.

The absorbent layer may comprise a number of sheets of creped cellulose or similar material, as shown in Figs. 1, 2, and 4, or a layer of fluffed woodpulp as shown in Fig. 3, or a combination of these. When woodpulp is used, an inner cellulose backing sheet 17 may be employed to support the pulp layer. The pulp may be laid on the sheet 17 and then covered with a facing sheet 11 which overlaps its ends. A backing sheet 13 then may be applied over the inner sheet 17 overlapping the turned over portions 16 of the facing sheet, as described in connection with Figs. 1 and 2.

If it is desired to employ the thermoplastic outer surface of the backing sheet 13 itself to heat seal the facing sheet 11 to the backing sheet, these sheets may be arranged as shown in Fig. 4. In this figure, the backing sheet is turned over the edges of the absorbent layer 12 and under the edges of the facing sheet which in turn covers only one side of the diaper. The overlapping portions 18 of the facing sheet may then be heat sealed to the turned over portions 19 of the thermoplastic film by conventional heat sealing means.

The plastic film comprising the external surface of the diaper must be of a soft, strong, abrasion resistant, completely waterproof material having good hand and drape. While vinyl films may be used, polyethylene is preferred because it is much less expensive. Since expense is a primary consideration, it is preferred that the thickness of the film itself be kept to a minimum consistent with the wear it must resist. In order to provide satisfactory results in the contemplated structure while providing a disposable diaper which is sufficiently inexpensive to compete in sales with re-usable diapers, the backing sheet laminate should comprise a waterproof plastic film no greater than 0.0015 inch in thickness fused to a supporting sheet of 15 to 30 lb. basis weight (24 x 36—500) absorbent and relatively soft paper. From the standpoint of economy even thinner plastic films are preferred. For instance, a backing sheet comprising a polyethylene film of 0.0005 inch in thickness used to a supporting sheet of 23 lb. basis weight (24 x 36—500) absorbent paper has been found to give excellent results in the diaper of this invention.

A plastic film of the type described, no greater than 0.0015 inch in thickness, must be laminated to a paper supporting sheet in order to provide a backing sheet with the strength and body desired. This supporting sheet 15 should be absorbent for reasons which will be described hereinafter, and relatively soft though strong in order to function properly in the diaper structure. The sheet 15 should be sufficiently thick and strong to allow it to be handled in a continuous extrusion, casting, or coating process during which the plastic film may be applied. A paper backed film of the type described above is inherently considerably more rigid than a free film of corresponding strength. To overcome this natural rigidity, the backing sheet laminate is embossed with a closely spaced pattern to improve its hand and drape. An embossing pattern of closely spaced intersecting lines, such as a "linen embossing" or a similar type, is preferred. However, any pattern which is spaced sufficiently closely to provide a backing sheet which is the equivalent in hand and drape may be used. Fig. 5 illustrates a linen embossing of closely spaced broad lines 21 and relatively narrow lines 22. Fig. 6 shows the way in which a backing sheet embossed with this type of pattern becomes "corrugated" to provide local flexibility with a consequent improvement in hand and drape. The external surface of a diaper embossed with this pattern has the appearance of a fabric and possesses a texture which is pleasing to the eye.

The interior absorbent surface of the backing sheet presented by the absorbent supporting sheet 15 tends to prevent the seepage or running of liquids along this surface. This "blotter effect" is particularly important when the diaper is bunched during use such that the backing sheet may become separated from the absorbent layer, particularly in way of the folds in highly bunched areas of the diaper. As illustrated in Fig. 7, which shows the diaper of Fig. 1 slightly bunched, separations between the backing sheet and the absorbent layer, illustrated at 23 and 24, may extend to an edge of the diaper such that they would provide channels for leakage were it not for the "blotter effect." Also, the absorbent supporting sheet 15 cooperates with the absorbent layer 12 such that its absorptive capacity is added to the total absorptive capacity of the diaper.

Thus the diaper of this invention may incorporate a minimum of the more expensive plastic material while utilizing a maximum of the absorbent materials it contains. It may be designed to have excellent hand and drape, while presenting a strong and abrasion resistant external surface which is aesthetically pleasing, and a "blotter-like" internal surface.

In the claims:

1. A disposable diaper comprising a thin permeable facing sheet, an absorbent layer, and a thin backing sheet comprising an outer waterproof plastic film no greater than 0.0015 inch in thickness fused to an inner supporting sheet of 15 to 30 lb. basis weight (24 x 36—500) absorbent and relatively soft paper, said backing sheet being embossed with a closely spaced pattern and said facing sheet and said backing sheet being secured together adjacent corresponding opposite edges with the absorbent layer between them and the absorbent side of said backing sheet facing inwardly.

2. A disposable diaper according to claim 1, wherein said plastic film is of a strong and abrasion resistant yet soft material.

3. A disposable diaper according to claim 2, wherein said material is polyethylene.

4. A disposable diaper according to claim 1, wherein said embossing pattern comprises closely spaced intersecting lines.

5. A disposable diaper comprising a thin facing sheet of permeable nonwoven material, an absorbent layer, and a thin backing sheet comprising an outer waterproof plastic film of polyethylene no greater than 0.0015 inch in thickness fused to an inner supporting sheet of 15 to 30 lb. basis weight (24 x 36—500) absorbent and relatively soft paper, said backing sheet being embossed with a linen embossing pattern of closely spaced intersecting lines and said facing sheet and said backing sheet being secured together adjacent corresponding opposite edges with the absorbent layer betwen them and the absorbent side of said backing sheet facing inwardly.

No references cited.